(12) United States Patent
Mendez

(10) Patent No.: US 7,539,665 B2
(45) Date of Patent: May 26, 2009

(54) SYSTEM AND METHOD FOR MERGING REMOTE AND LOCAL DATA IN A SINGLE USER INTERFACE

(75) Inventor: Daniel J. Mendez, Menlo Park, CA (US)

(73) Assignee: Visto Corporation, Redwood Shores, CA (US)

( * ) Notice: Subject to any disclaimer, the term of this patent is extended or adjusted under 35 U.S.C. 154(b) by 42 days.

(21) Appl. No.: 10/279,369

(22) Filed: Oct. 23, 2002

(65) Prior Publication Data

US 2003/0097358 A1    May 22, 2003

Related U.S. Application Data

(60) Provisional application No. 60/336,444, filed on Oct. 23, 2001.

(51) Int. Cl.
*G06F 7/00* (2006.01)
(52) U.S. Cl. ............... 707/3; 707/2; 707/4; 707/5; 707/6
(58) Field of Classification Search ............... 707/3, 707/10, 104.1, 1, 2, 102
See application file for complete search history.

(56) References Cited

U.S. PATENT DOCUMENTS

| | | | |
|---|---|---|---|
| 5,530,861 A * | 6/1996 | Diamant et al. | 705/8 |
| 5,787,415 A * | 7/1998 | Jacobson et al. | 707/2 |
| 5,819,273 A * | 10/1998 | Vora et al. | 707/10 |
| 6,023,708 A | 2/2000 | Mendez et al. | |
| 6,061,798 A * | 5/2000 | Coley et al. | 726/12 |
| 6,169,986 B1 | 1/2001 | Bowman et al. | |
| 6,253,203 B1 * | 6/2001 | O'Flaherty et al. | 707/9 |
| 6,304,881 B1 | 10/2001 | Halim et al. | |
| 6,311,186 B1 | 10/2001 | Melampy et al. | |
| 6,324,542 B1 | 11/2001 | Wright, Jr. et al. | |
| 6,421,673 B1 * | 7/2002 | Caldwell et al. | 707/10 |
| 6,463,433 B1 * | 10/2002 | Baclawski | 707/5 |
| 6,611,607 B1 * | 8/2003 | Davis et al. | 382/100 |
| 6,633,873 B1 * | 10/2003 | Nakamura | 707/10 |
| 6,636,853 B1 * | 10/2003 | Stephens, Jr. | 707/10 |
| 6,711,565 B1 * | 3/2004 | Subramaniam et al. | 707/3 |
| 6,772,169 B2 * | 8/2004 | Kaplan | 707/102 |
| 6,775,669 B2 * | 8/2004 | Uesaka | 707/10 |
| 6,810,402 B2 * | 10/2004 | Bates et al. | 707/104.1 |
| 6,928,428 B1 * | 8/2005 | De Vries | 707/3 |
| 7,039,679 B2 | 5/2006 | Mendez et al. | |

(Continued)

OTHER PUBLICATIONS

Paul McFedries "The Complete Idiot's guide to Microsoft Windows 2000 Professional", 2000, pp. 53-54.*

(Continued)

*Primary Examiner*—Hung Q Pham
(74) *Attorney, Agent, or Firm*—Oblon, Spivak, McClelland, Maier & Neustadt, P.C.

(57) ABSTRACT

The system comprises a local database; a user interface; a remote access engine, communicatively coupled to a network, the user interface, and the local database; and a rendering engine, communicatively coupled to the remote access engine. The user interface receives a data search request. The remote access engine searches for and retrieves, from a remote database communicatively coupled to the network and the local database, data corresponding to the received search request. The rendering engine displays the received data from the remote database and the local database.

42 Claims, 6 Drawing Sheets

U.S. PATENT DOCUMENTS

| | | | |
|---|---|---|---|
| 2002/0059163 A1* | 5/2002 | Smith | 707/1 |
| 2003/0097358 A1 | 5/2003 | Mendez | |
| 2003/0130984 A1 | 7/2003 | Quinlan et al. | |
| 2004/0117310 A1 | 6/2004 | Mendez et al. | |
| 2006/0195595 A1 | 8/2006 | Mendez et al. | |
| 2007/0174433 A1 | 7/2007 | Mendez et al. | |

OTHER PUBLICATIONS

U.S. Appl. No. 90/008,397, filed Dec. 29, 2006, Mendez, et al.
U.S. Appl. No. 09/528,363, filed Mar. 17, 2000, Mendez, et al.
U.S. Appl. No. 90/008,062, filed Jun. 23, 2006, Mendez, et al.
U.S. Appl. No. 90/007,040, filed May 18, 2004, Mendez, et al.
U.S. Appl. No. 90/007,093, filed Jun. 18, 2006, Mendez, et al.
U.S. Appl. No. 90/007,933, filed Feb. 10, 2006, Mendez, et al.
U.S. Appl. No. 90/007,421, filed Feb. 15, 2005, Mendez, et al.
U.S. Appl. No. 90/008,162, Aug. 11, 2006, Mendez, et al.
U.S. Appl. No. 90/008,131, filed Jul. 27, 2006, Mendez, et al.
U.S. Appl. No. 90/008,292, filed Oct. 11, 2006, Mendez.

* cited by examiner

SYSTEM AND METHOD FOR MERGING REMOTE AND LOCAL DATA IN A SINGLE USER INTERFACE

PRIORITY REFERENCE TO PRIOR APPLICATIONS

This application claims benefit of and incorporates by reference patent application Ser. No. 60/336,444, entitled "System And Method For Merging Remote And Local Data In A Single User Interface," filed on Oct. 23, 2001, by inventor Daniel Mendez.

TECHNICAL FIELD

This invention relates generally to user interfaces, and more particularly, but not exclusively, provides a system and method for merging remotely and locally stored data into a single user interface.

BACKGROUND

Conventionally, wireless devices, such as wireless-enabled PDAs, enable a user to search for, retrieve, and display locally stored data. Further, wireless devices may also enable a user to search for, retrieve, and display remotely stored data. However, even if search terms are identical for searching from locally stored and remotely stored data, each search must be performed separately, and results must be displayed separately.

Accordingly, a new system and method for searching, retrieving, and displaying locally and remotely stored data are needed.

SUMMARY

The present invention provides a system for merging remotely and locally stored data into a single user interface. The system comprises a remote access client; a browser/rendering client; an application/user interface (UI); and a local database. The remote access client enables the system to access remotely stored data. The browser/rendering client renders a display on a monitor or other display device. The application/user interface receives data search requests and enables a user to refine data search requests. Further, the application/user interface, in conjunction with the remote access engine, accesses remotely stored data to receive data corresponding to the search request. The application/user interface also accesses the local database to retrieve locally stored data corresponding to the search request. The application/user interface, in conjunction with the browser/rendering client, then displays the matching data from the database and from the remotely stored data in a merged interface.

The present invention further provides a method for merging remotely and locally stored data into a single user interface. The method comprises: receiving a data search request, searching locally stored and remotely stored data for data corresponding to the data search request; retrieving data corresponding to the data search request from locally and remotely stored data, and displaying the retrieved data from locally stored and remotely stored locations corresponding to the data search request in a merged user interface.

Accordingly, the system and method may advantageously merge remotely and locally stored data into a single user interface.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE ILLUSTRATED EMBODIMENTS

The following description is provided to enable any person skilled in the art to make and use the invention, and is provided in the context of a particular application and its requirements. Various modifications to the embodiments will be readily apparent to those skilled in the art, and the generic principles defined herein may be applied to other embodiments and applications without departing from the spirit and scope of the invention. Thus, the present invention is not intended to be limited to the embodiments shown, but is to be accorded the widest scope consistent with the principles, features and teachings disclosed herein.

Figure 1:
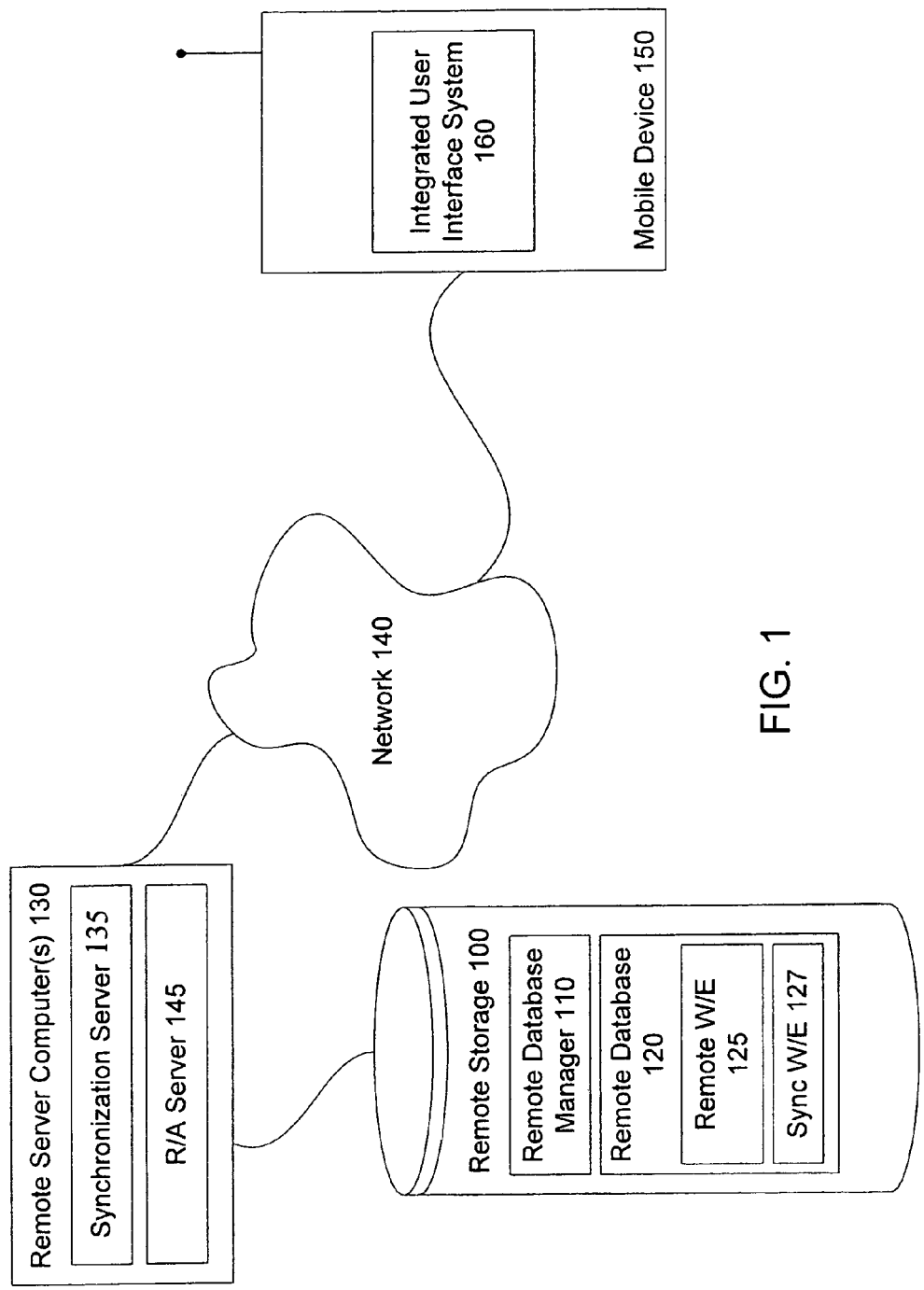
FIG. 1 is a block diagram illustrating a network system in accordance with an embodiment of the present invention.

FIG. 1 is a block diagram illustrating a mobile device 150, and remote server computer(s) 130 communicatively coupled to a network 140, such as the Internet or a LAN, etc. In an embodiment of the invention, remote server computer(s) may be behind a firewall. The remote server computer(s) 130 is communicatively coupled to remote storage 100. Mobile device 150 may include a personal digital assistant (PDA), laptop computer, mobile phone or any other device capable to communicate with remote server computer(s) 130. Further, mobile device 150, as well as remote server computer(s) 130, may be communicatively coupled to network 140 via a wired or wireless connection. In an alternative embodiment, mobile device 150 may be directly communicatively coupled to remote server computer(s) 130 without the use of network 140. Mobile device 150 will be discussed in further detail in conjunction with FIG. 2.

Remote server computer(s) 130 includes a synchronization server 135 and a remote access (R/A) server 145. Synchronization server 135 synchronizes sync W/E 127 in remote database 120 with data stored in mobile device 150.

Remote storage device 100 may include a server or other device for storing data and is capable to communicate with remote server computer(s) 130. Remote storage 100 includes a remote database manager 110 and a remote database 120. Remote database manager 110 manages database 120, which includes remote workspace elements (W/E) 125 and sync W/E 127. Remote W/E 125 includes data that is stored remotely and not synchronized with data stored in mobile device 150. Sync W/E 127 includes data that is stored remotely and also synchronized with data stored in mobile device 150. In general, remote database 120 may include corporate data, such as a corporate directory, corporate schedules, sales force automation (SFA) data, and/or customer relationship management (CRM) data, etc. As compared with database 340 (FIG. 3) of mobile device 150, remote database 120 generally may include information that is sensitive, voluminous, and/or quickly stale. R/A server 145 enables mobile device 150 to remotely log into remote storage 100 and access remote database 120 to search for and retrieve data.

Figure 2:
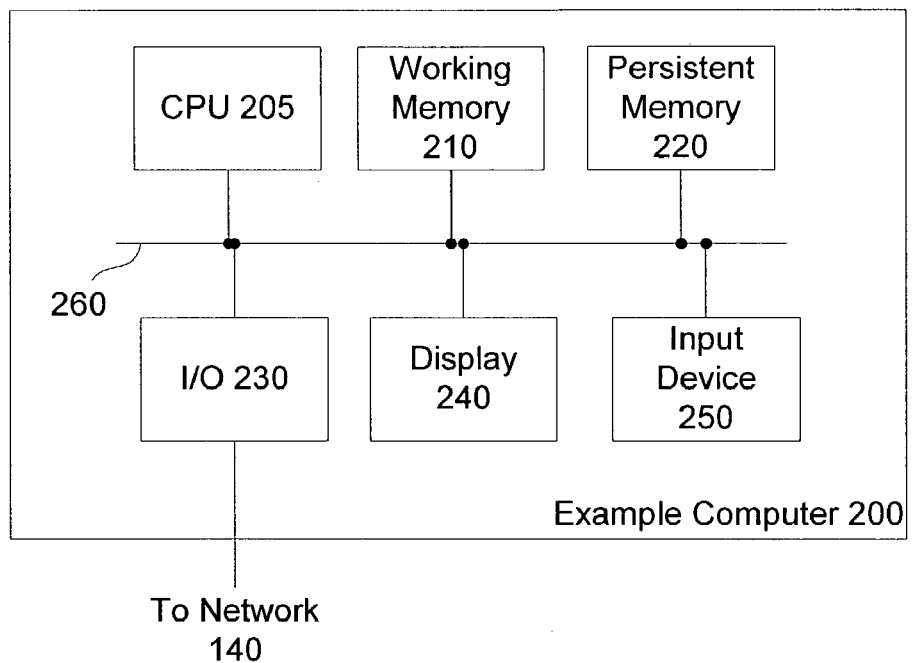
FIG. 2 is a block diagram illustrating an example computer in accordance with an embodiment of the present invention.

FIG. 2 is a block diagram illustrating an example computer in accordance with the present invention. In an embodiment of the invention, mobile device 150 and remote server computer(s) 130 may include or be resident on a computer that is substantially similar to example computer 200. The example computer 200 includes a central processing unit (CPU) 205; working memory 210; persistent memory 220; input/output (I/O) interface 230; display 240 and input device 250, all communicatively coupled to each other via system bus 260. CPU 205 may include an Intel Pentium® microprocessor, a Motorola PowerPC® microprocessor, or any other processor capable to execute software stored in persistent memory 220. Working memory 210 may include random access memory (RAM) or any other type of read/write memory devices or combination of memory devices. Persistent memory 220 may include a hard drive, read only memory (ROM) or any other type of memory device or combination of memory devices that can retain data after example computer 200 is shut off. I/O interface 230 is communicatively coupled, via wired or wireless techniques, to network 140. In an alternative embodiment of the invention, I/O 230 may be directly communicatively coupled to a server or computer, thereby eliminating the need for network 140. Display 240 may include a cathode ray tube display or other display device. Input device 250 may include a keyboard, mouse, or other device for inputting data, or a combination of devices for inputting data.

One skilled in the art will recognize that the example computer 200 may also include additional devices, such as network connections, additional memory, additional processors, LANs, input/output lines for transferring information across a hardware channel, the Internet or an intranet, etc. One skilled in the art will also recognize that the programs and data may be received by and stored in the system in alternative ways.

Figure 3:
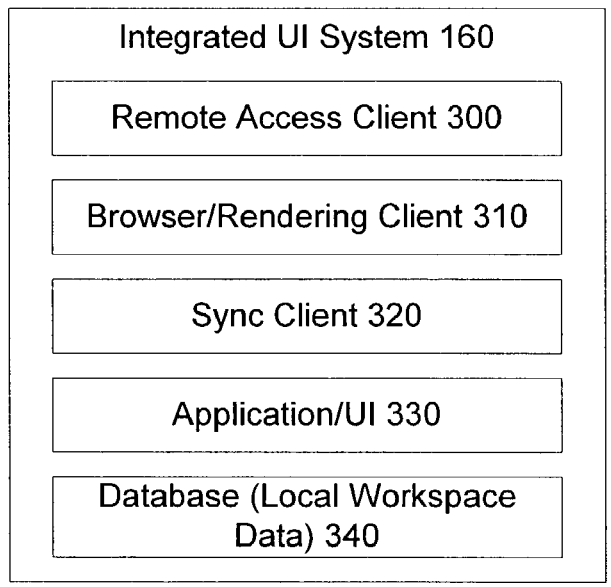
FIG. 3 is a block diagram illustrating details of the integrated user interface system of FIG. 1.

FIG. 3 is a block diagram illustrating integrated UI system 160 of the mobile device 150. System 160 includes a remote access client 300, a browser/rendering client 310, a sync client 320, an application/UI 330, and a database 340. Remote access client 300 accesses remote database 120 (FIG. 1) for searching, modifying and/or retrieving data. Browser/rendering client 310 renders data so as to be viewable on display 240. Sync client 320, in conjunction with remote access client 300, synchronizes data stored in database 340 with data stored in remote database 120.

Note that not all data in database 340 is synchronized with remote database 120. Conversely, not all data in remote database 120 is synchronized with database 340. For example, remote W/E 125 in remote database 120, which may be deemed to be sensitive, voluminous or quickly goes stale, will not be synchronized with database 340 because the mobile device may be easily lost or stolen, may contain limited memory for storing data, may have limited bandwidth to transfer large amounts of data, and/or for other reasons. Also note that not all data in database 340 will be synchronized with remote database 120 because some of the data in database 340 may be private, personal, and/or for other reasons. Alternatively, data in database 340 may be synchronized with a second remote storage device (not shown).

Application/UI 330 includes a client capable to accept data search requests from a user and to refine those requests. Further, application/UI 330 searches local database 340 and, in conjunction with remote access client 300, queries remote database manager 110 to search remote database 120 for data corresponding to the data search requests and retrieves the corresponding data. Application/UI 330, in conjunction with browser/rendering client 310, can display the retrieved data in a merged user interface on a display, such as display 240.

Application/UI 330 may include a single user interface application or may include a plurality of user interface applications. For example, in an embodiment of the invention, application/UI 330 may include a corporate directory UI capable to search, retrieve, and display corporate directory workspace elements from remote database 120 and database 340 in a single merged UI. In another embodiment of the invention, application/UI 330 may include a calendar UI capable to search, retrieve, and display calendar workspace elements from remote database 120 and database 340 into a single merged display. Other embodiments of application/UI 340 include a customer relationship management (CRM) interface, a sales force automation (SFA) interface, a tasks interface, and a files interface.

Figure 4:
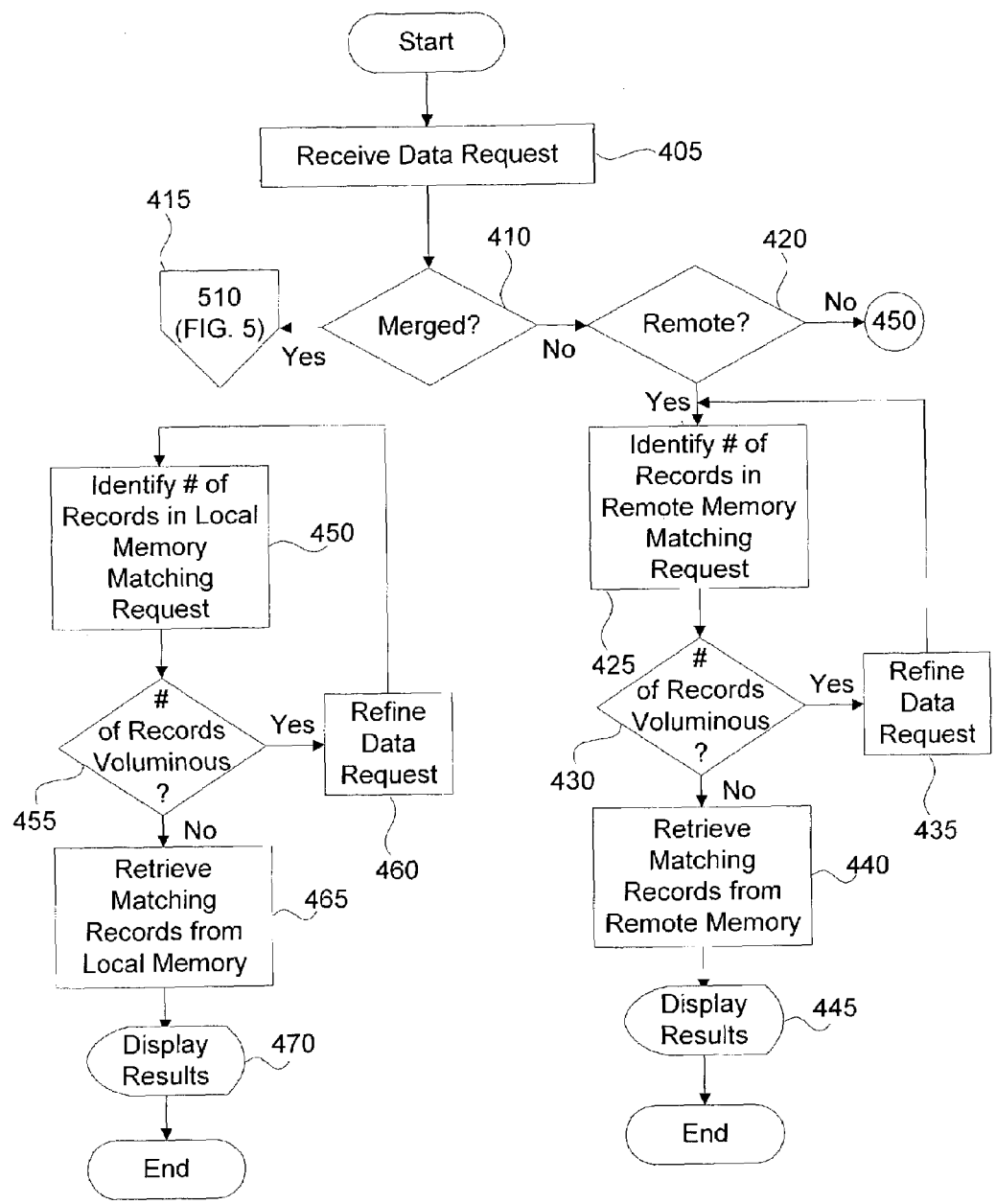
FIG. 4 is a flowchart illustrating a method for viewing data stored either locally or remotely

FIG. 4 is a flowchart illustrating a method 400 for viewing data stored either locally or remotely. In an embodiment of the invention, application/UI 330, in conjunction with remote access client 300 and browser/rendering client 310, perform the method 400. First, a data request is received (405) from a user via a data input device, such as input device 250, of a device, such as mobile device 150. The data request may include a type of data to search for (e.g., CRM, SFA, corporate directory data, calendar data, etc.), search terms, and whether to search a remote database, a local database, or both local and remote (i.e., merged) databases. Next, it is determined (410) if the data request is for merged data (i.e., search both local and remote databases). If the data request is for merged data, then a number of workspace elements in local and remote databases matching the search terms is identified (510, FIG. 5) as will be discussed further below in conjunction with FIG. 5.

If the data request does not specify searching both remote and local databases, then it is determined (420) if the data request is for a remote database only. If the data request is not for a remote database, then the data request is for a local database and a number of workspace elements in a local database, such as database 340, matching the search terms is identified (450), as will be discussed further below.

If data request is for a remote database, then a number of workspace elements in a remote database, such as remote database 120, that match the search request terms is identified (425). It is then determined (430) if the number of matching workspace elements is voluminous, e.g., more than can be displayed simultaneously on a display, such as display 240, or more than a pre-specified number, etc. If the number of workspace elements is determined to be voluminous, then search terms in the data request are refined (435) per a user's specifications or via other techniques. The number of workspace elements matching the refined search terms is then identified (425). This process of refining search terms is repeated until the number of workspace elements is determined not to be voluminous.

After the number of workspace elements having matching search terms has been determined not to be voluminous, then the matching workspace elements are retrieved (440) from the remote database. The retrieved workspace elements are then displayed (445) on display device, such as display 240. In another embodiment of the invention, the retrieved workspace elements or a subset of retrieved workspace elements may then also be stored in local memory. The method 400 then ends.

If it is determined that the search request is not for a remote database, as discussed above, then, a number of workspace elements in a local database matching the search terms in the request is identified (450). It is then determined (455) if the number of matching workspace elements in the local database is voluminous, e.g., more than can be displayed simultaneously on a display, such as display 240, or more than a pre-specified number, etc. If the number of workspace elements is determined to be voluminous, then search terms in the data request are refined (460) per a user's specifications or via other techniques. The number of workspace elements matching the refined search terms is then identified (450). This process of refining search terms is repeated until the number of workspace elements is determined not to be voluminous.

After the number of workspace elements having matching search terms has been determined not to be voluminous, then the matching workspace elements are retrieved (465) from the local database. The retrieved workspace elements are then displayed (470) on a display device, such as display 240. The method 400 then ends.

Figure 5:
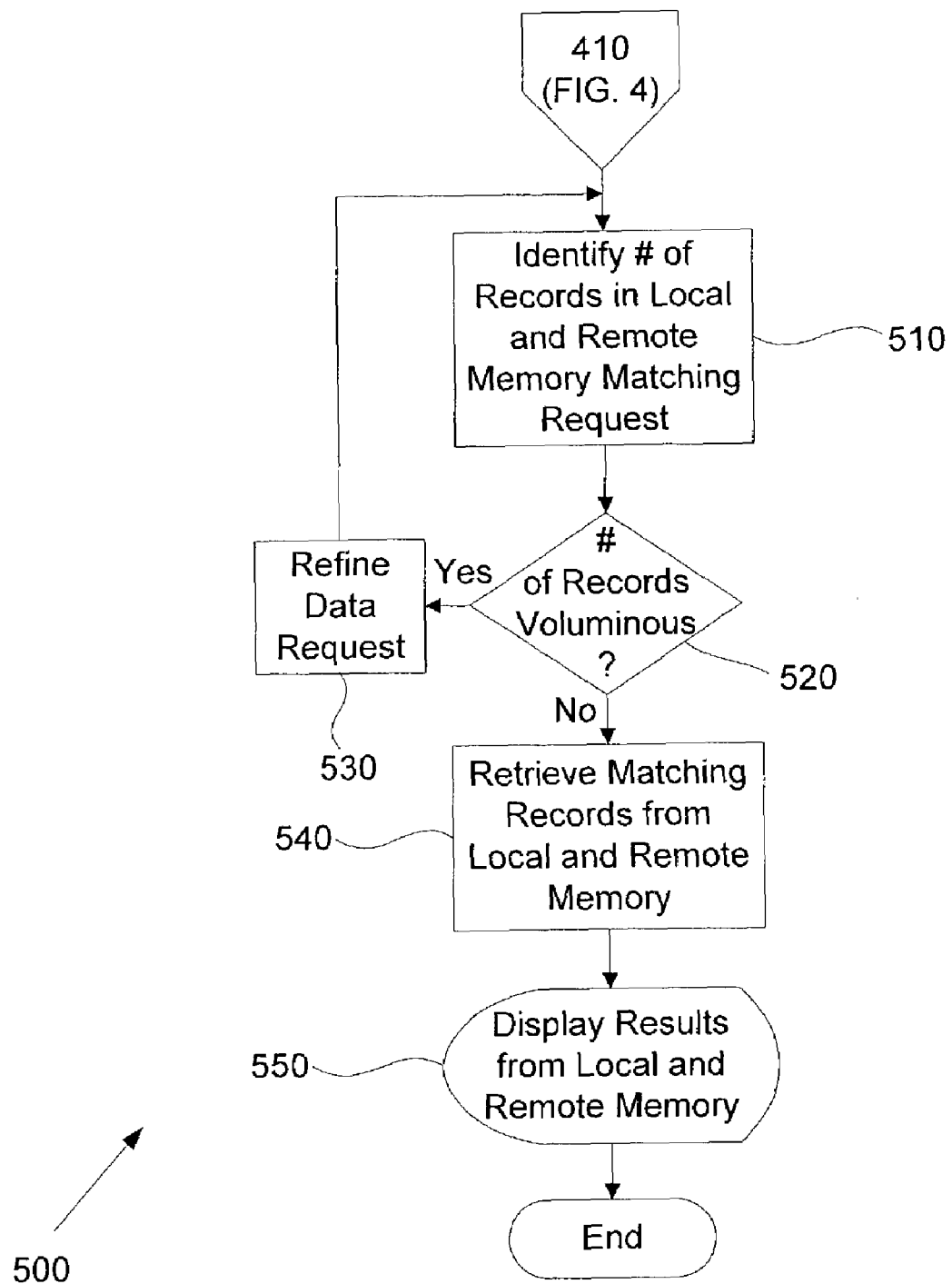
FIG. 5 is a flowchart illustrating a method for merging remotely and locally stored data into a single user interface.

FIG. 5 is a flowchart illustrating a method 500 for merging remotely and locally stored data into a single user interface. In an embodiment of the invention, application/UI 330 in conjunction with remote access client 300 and browser/rendering client 310, perform the method 500. After receiving (405; FIG. 4) a data request and determining (410) that the data request is for workspace elements from both a local and a remote database, a number of workspace elements in the local and the remote databases matching the data request is determined (510). It is then determined (520) if the number of matching workspace elements is voluminous, e.g., more than can be displayed simultaneously on a display, such as display 240, or more than a pre-specified number, etc. If the number of workspace elements is determined to be voluminous, then search terms in the data request are refined (530) per a user's specifications or via other techniques. The number of workspace elements matching the refined search terms is then identified (510). This process of refining search terms is repeated until the number of workspace elements is determined not to be voluminous.

After the number of workspace elements having matching search terms has been determined not to be voluminous, then the matching workspace elements are retrieved (540) from the remote database. The retrieved workspace elements from both local and remote databases are then displayed (550) on display device, such as display 240. In another embodiment of the invention, the retrieved workspace elements or a subset of retrieved workspace elements from the remote database may then also be stored in the local database. Further, the retrieved workspace elements or a subset of retrieved workspace elements from the local database may then also be stored in the remote database. The method 500 then ends.

Figure 6:
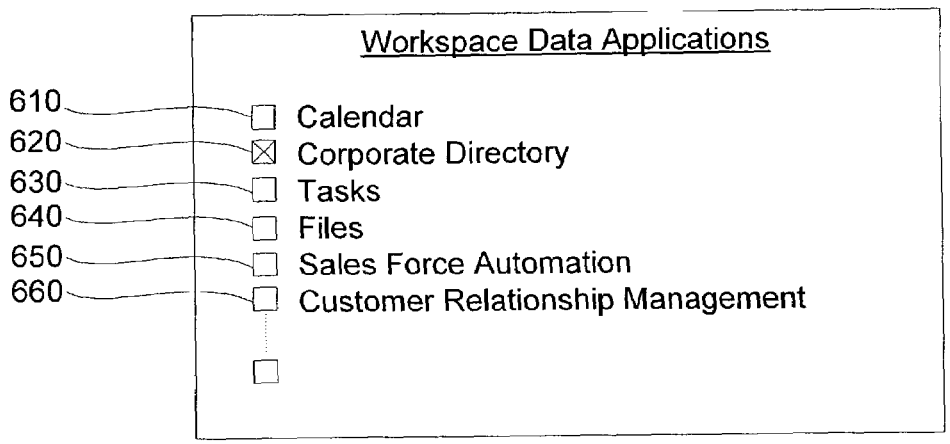
FIG. 6 is a diagram illustrating an example embodiment of a user interface selection page.

FIG. 6 is a diagram illustrating an example embodiment of a user interface selection page. The page enables a user to select one of n, e.g., six user interfaces for retrieving data from remote and/or local memory. The user interfaces include a calendar 610, directory 620, tasks 630, files 640, SFA 650 and CRM 660. In another embodiment of the invention, additional or alternative UIs may be available.

Figure 7:
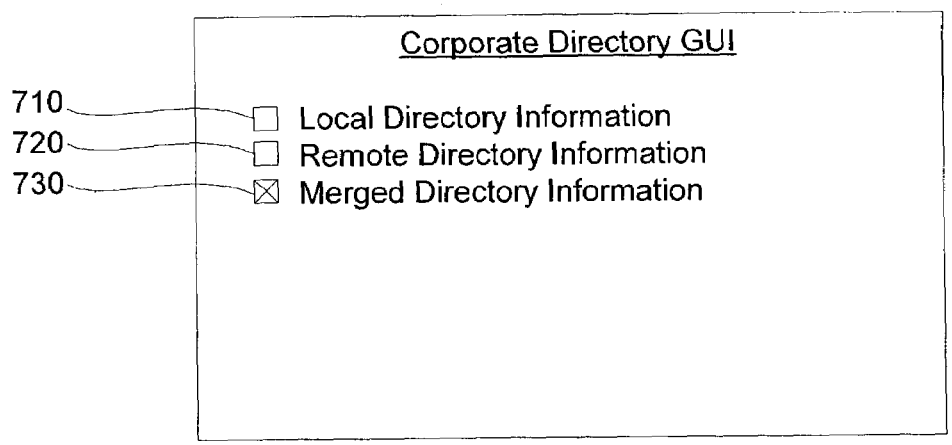
FIG. 7 is a diagram illustrating a corporate directory graphical user interface for searching and retrieving data from a local memory, a remote memory and merged memory (i.e., both local and remote memory)

FIG. 7 is a diagram illustrating a corporate directory graphical user interface for searching and retrieving data from a local database, a remote database and merged databases (i.e., both local and remote databases). Options for searching and retrieving data include a first option 710 to enable a user to retrieve data from a local database, a second option 720 to retrieve data from a remote database, and a third option 730 for retrieving data from both local and remote databases.

Figure 8:
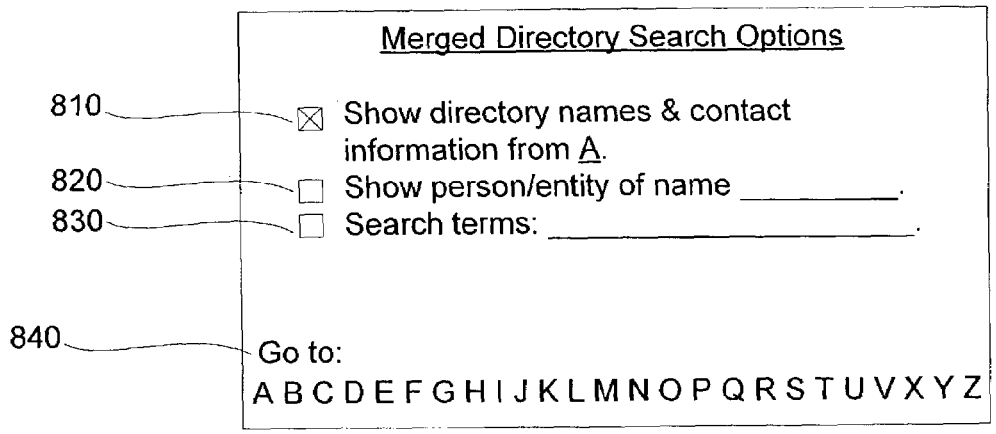
FIG. 8 is a diagram illustrating a search term page for retrieving data from both local and remote memory for display in a single interface.

FIG. 8 is a diagram illustrating a search term page for retrieving data from both local and remote databases for display in a single interface. Search options include a first option 810 to show workspace elements in alphabetical order starting with a letter selected by a user via entering the desired letter; a second option 820 to show workspace elements based on having a specific name; a third option 830 for entering search terms; and fourth option 840 to show directory workspace elements in alphabetic order starting with a letter as selected by a user pressing a button corresponding to the letter. Other methods of searching and retrieving workspace elements may also be incorporated into the search term page including a Boolean terms search, etc.

Figures 9, 10:
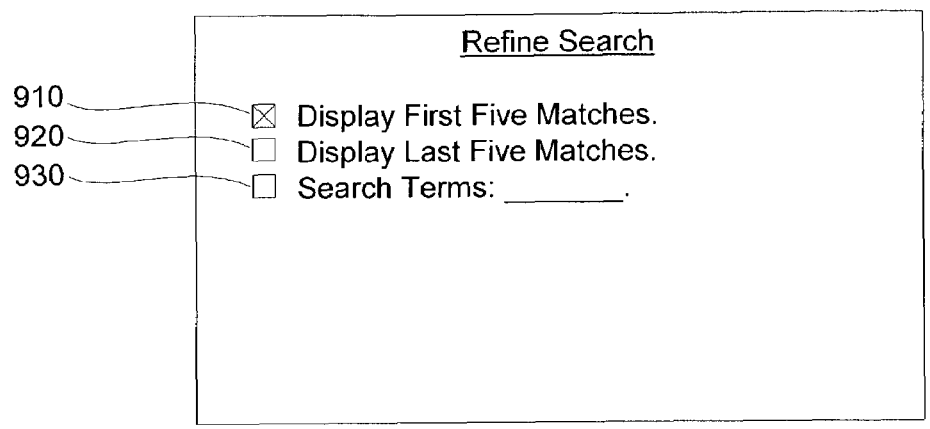
FIG. 9 is a diagram illustrating a refine search page.
FIG. 10 is a diagram illustrating local and remote corporate data merged into an example single user interface.

FIG. 9 is a diagram illustrating a refine search page. If the search performed returns a number of workspace elements determined to be voluminous, e.g. too many workspace elements to be displayed simultaneously, etc. then the number of matching workspace elements must be pared down. Options for refining the search include a first option 910 to only display the first five matching workspace elements; a second option 920 to display the last five matches; and a third option 930 to search the matching workspace elements using user-specified search terms. In an embodiment of the invention, other techniques for refine a search may also be included.

FIG. 10 is a diagram illustrating local and remote corporate directory data merged into an example single user interface. The interface displays workspace elements 1010, which for each workspace element includes an employee name, an email address, and a store indicating where the workspace element is stored, i.e., local or remote. For example, employee Aaron has an email address of aaron@abc.com and his or her workspace element is stored in remote memory. In comparison, employee Andrews has an email address of Andrews@abc.com and his or her workspace element is stored in local memory. In an alternative embodiment, workspace elements may display additional or alternative data, such as home, work, facsimile and/or mobile phone numbers, email addresses, employee photos, employee identification numbers, employee job skills, languages spoken by employees, employee job positions or titles, employee educational backgrounds, corporate location, etc. In addition, workspace elements 1010 may include data workspace elements for corporations, corporate subdivisions, and other entities.

In addition to the workspace elements 1010, the interface of FIG. 10 also has buttons 1020 for performing functions including: adding a new workspace element to a local database; delete a workspace element from local or remote databases (in one embodiment, a user may only be able to delete a workspace element from a local database); add a workspace element stored remotely, such as workspace element 1010*a*, to a local database or add a workspace element stored locally, such as workspace element 1010*d*, to a remote database;

display a first page of workspace elements according to search parameters defined earlier; display a next page of workspace elements according to search parameters defined earlier; displaying a previous page of workspace elements according to search parameters defined earlier; and displaying a last page of workspace elements according to search parameters defined earlier. In an alternative embodiment of the invention, other features may be instituted in addition or in alternative to the features enabled by buttons 1020.

The foregoing description of the preferred embodiments of the present invention is by way of example only, and other variations and modifications of the above-described embodiments and methods are possible in light of the foregoing teaching. Although the network sites are being described as separate and distinct sites, one skilled in the art will recognize that these sites may be a part of an integral site, may each include portions of multiple sites, or may include combinations of single and multiple sites on either side of a firewall. Further, components of this invention may be implemented using a programmed general purpose digital computer, using application specific integrated circuits, or using a network of interconnected conventional components and circuits. Connections may be wired, wireless, modem, etc. The embodiments described herein are not intended to be exhaustive or limiting. The present invention is limited only by the following claims.

What is claimed is:

1. A method, comprising:
   receiving, from a handheld device, a data search request specifying at least one database to search for data;
   searching in a local database, upon indication that the local database is included in the at least one database specified in the received data search request, for each data entry in the local database fulfilling requirements of the received data search request;
   querying via a wireless connection a remote database manager to search in a remote database, upon indication that the remote database is included in the at least one database specified in the received data search request, for each data entry in the remote database fulfilling the requirements of the received data search request;
   determining if receiving data from the local and remote databases corresponding to the received data search request exceeds a threshold of an amount of data that is displayed simultaneously on a display of the handheld device;
   refining the received data search request if the determining indicates that the received data corresponding to the received data search request exceeds the threshold;
   retrieving, from the local database, data entries found in the searching fulfilling the requirements of the refined data search request;
   receiving, from the remote database via the wireless connection, data entries found in the querying fulfilling the requirements of the refined data search request;
   merging the retrieved and received data entries; and
   presenting the merged data entries in a single user interface on the display.

2. The method of claim 1, further comprising:
   excluding voluminous data exceeding a threshold, the voluminous data stored in the remote database, from the received data corresponding to the received data search request.

3. The method of claim 1, further comprising:
   excluding confidential data, stored in the remote database, from the received data corresponding to the received data search request.

4. The method of claim 1, further comprising:
   excluding obsolete data that is stored in the remote database longer than a threshold time period from the received data corresponding to the received data search request.

5. The method of claim 1, further comprising:
   excluding personal data associated with a user, the personal data stored in the local database, from the received data corresponding to the received data search request.

6. The method of claim 1, wherein the local and remote databases store sales force automation data.

7. The method of claim 1, wherein the local and remote databases store customer relations management data.

8. The method of claim 1, wherein the local and remote databases store corporate directory data.

9. The method of claim 1, wherein the local and remote databases store calendar data.

10. The method of claim 1, wherein the local and remote databases store tasks data.

11. The method of claim 1, wherein the local and remote databases store files.

12. The method of claim 1, further comprising: saving, to the local database, the data received from the remote database.

13. The method of claim 1, further comprising:
   accessing the remote database using a one port of a plurality of ports on a firewall; and
   presenting in the single user interface that the retrieved data is stored in the local database, and the received data is stored in the remote database.

14. The method of claim 1, wherein searching the local database and querying the remote database manager are performed in response to a sole data search request.

15. A computer readable medium, including computer executable instructions that cause a computer to implement a method comprising:
   receiving, from a handheld device, a data search request specifying at least one database to search for data;
   searching in a local database, upon indication that the local database is included in the at least one database specified in the received data search request, for each data entry in the local database fulfilling requirements of the received data search request;
   querying via a wireless connection a remote database manager to search in a remote database, upon indication that the remote database is included in the at least one database specified in the received data search request, for each data entry in the remote database fulfilling the requirements of the received data search request;
   determining if receiving data from the local and remote databases corresponding to the received data search request exceeds a threshold of an amount of data that is displayed simultaneously on a display of the handheld device;
   refining the received data search request if the determining indicates that the received data corresponding to the received data search request exceeds the threshold;
   retrieving, from the local database, data entries found in the searching fulfilling the requirements of the refined data search request;
   receiving, from the remote database via the wireless connection, data entries found in the querying fulfilling the requirements of the refined data search request;
   merging the retrieved and received data entries; and
   presenting the merged data entries in a single user interface on the display.

16. The method of claim 15, further comprising:
excluding voluminous data exceeding a threshold, the voluminous data stored in the remote database, from the received data corresponding to the received data search request.

17. The method of claim 15, further comprising:
excluding confidential data, stored in the remote database, from the received data corresponding to the received data search request.

18. The method of claim 15, further comprising:
excluding obsolete data that is stored in the remote database longer than a threshold time period from the received data corresponding to the received data search request.

19. The method of claim 15, further comprising:
excluding personal data associated with a user, the personal data stored in the local database, from the received data corresponding to the received data search request.

20. The computer readable medium of claim 15, wherein the local and remote databases store sales force automation data.

21. The computer readable medium of claim 15, wherein the local and remote databases store customer relations management data.

22. The computer readable medium of claim 15, wherein the local and remote databases store corporate directory data.

23. The computer readable medium of claim 15, wherein the local and remote databases store calendar data.

24. The computer readable medium of claim 15, wherein the local and remote databases store tasks data.

25. The computer readable medium of claim 15, wherein the local and remote databases store files.

26. The computer readable medium of claim 15, wherein the method further comprises:
saving, to the local database, data received from the remote database.

27. The computer readable medium of claim 15, wherein the method further comprises:
accessing the remote database using port one of a plurality of ports on a firewall, and
presenting in the single user interface that the retrieved data is stored in the local database, and the received data is stored in the remote database.

28. The computer readable medium of claim 15, wherein searching the local database and querying the remote database manager are performed in response to a sole data search request.

29. A system, comprising:
at least one server computer coupled to a network:
means for receiving, from a handheld device, a data search request specifying at least one database to search for data;
means for searching in a local database, upon indication that the local database is included in the at least one database specified in the received data search request, for each data entry in the local database fulfilling requirements of the received data search request;
means for querying via a wireless connection a remote database manager to search in a remote database, upon indication that the remote database is included in the at least one database specified in the received data search request, for each data entry in the remote database fulfilling the requirements of the received data search request;
means for determining if receiving data from the local and remote databases corresponding to the received data search request exceeds a threshold of an amount of data that is displayed simultaneously on a display of the handheld device;
means for refining the received data search request if the determining indicates that the received data corresponding to the received data search request exceeds the threshold;
means for retrieving, from the local database, data entries found by the means for searching fulfilling the requirements of the refined data search request;
means for receiving, from the remote database via the wireless connection, data entries found by the means for querying fulfilling the requirements of the refined data search request;
means for merging the retrieved and received data entries; and
means for presenting the merged data entries in a single user interface on the display.

30. The system of claim 29, wherein the means for querying the remote database manager queries the remote database manager in response to a sole data search request.

31. An apparatus, comprising:
a processor;
a local database;
a user interface, communicatively coupled to the local database, receives a data search request, from a handheld device, specifying at least one database to search for data and to search for and retrieve, from the local database, upon indication that the local database is included in the at least one database specified in the received data search request, each data entry in the local database fulfilling requirements of the received data search request;
a remote access engine, communicatively coupled to a network and the user interface, queries and receives via a wireless connection, from a remote database communicatively coupled to the network, upon indication that the remote database is included in the at least one database specified in the received data search request, each data entry in the remote database fulfilling requirements of the received data search request; and
the user interface further
determines if receiving data from the local and remote databases corresponding to the received data search request exceeds a threshold of an amount of data that is displayed simultaneously on a display of the handheld device;
refines the received data search request if the user interface determines that the received data corresponding to the received data search request exceeds the threshold:
retrieves, from the local database, data entries found in the searching fulfilling the requirements of the refined data search request;
receives, from the remote database via the wireless connection, data entries found in the querying fulfilling the requirements of the refined data search reguest;
a rendering engine, communicatively coupled to the remote access engine and the user interface, merges the received data from the remote database and the retrieved data from the local database and presents the merged data in a single user interface on the display.

32. The apparatus of claim 31, wherein the rendering engine further excludes personal data stored in the local database.

33. The apparatus of claim 31, wherein the local database stores sales force automation data.

34. The apparatus of claim 31, wherein the local database stores customer relations management data.

35. The apparatus of claim 31, wherein the local database stores corporate directory data.

36. The apparatus of claim 31, wherein the local database stores calendar data.

37. The apparatus of claim 31, wherein the local database stores tasks data.

38. The apparatus of claim 31, wherein the local database stores files.

39. The apparatus of claim 31, wherein the user interface further saves, to the local database, data received from the remote database.

40. The system of claim 29, further comprising: a firewall to protect the remote database, wherein the means for presenting the retrieved and received data in the single user interface also presents in the single user interface that the retrieved data is stored in the local database, and the received data is stored in the remote database.

41. The apparatus of claim 31, further comprising: a firewall to protect the remote database, and wherein the rendering engine is further configured to present in the single user interface that the retrieved data is stored in the local database, and the received data is stored in the remote database.

42. The apparatus of claim 31, wherein the remote access engine queries the remote database in response to a sole data search request.

* * * * *